United States Patent
Omont et al.

(10) Patent No.: US 11,725,144 B2
(45) Date of Patent: Aug. 15, 2023

(54) METHOD FOR STABILIZING SANDY SOILS

(71) Applicant: S.P.C.M. SA, Andrezieux-Boutheon (FR)

(72) Inventors: Alexandre Omont, Andrezieux (FR); Xavier Riveau, Andrezieux (FR)

(73) Assignee: S.P.C.M. SA, Andrezieux-Boutheon (FR)

( * ) Notice: Subject to any disclaimer, the term of this patent is extended or adjusted under 35 U.S.C. 154(b) by 120 days.

(21) Appl. No.: 17/058,286

(22) PCT Filed: May 23, 2019

(86) PCT No.: PCT/EP2019/063385
§ 371 (c)(1),
(2) Date: Nov. 24, 2020

(87) PCT Pub. No.: WO2019/224328
PCT Pub. Date: Nov. 28, 2019

(65) Prior Publication Data
US 2021/0198573 A1 Jul. 1, 2021

(30) Foreign Application Priority Data

May 24, 2018 (FR) ..................................... 18 54400

(51) Int. Cl.
*C09K 17/22* (2006.01)
*C08L 33/02* (2006.01)
*C08L 33/26* (2006.01)

(52) U.S. Cl.
CPC .............. *C09K 17/22* (2013.01); *C08L 33/02* (2013.01); *C08L 33/26* (2013.01)

(58) Field of Classification Search
None
See application file for complete search history.

(56) References Cited

U.S. PATENT DOCUMENTS

| 4,367,323 A | 1/1983 | Fujita et al. |
| 6,130,304 A | 10/2000 | Sumiya et al. |
| 10,160,908 B2 | 12/2018 | Lecointe |
| 2012/0258811 A1* | 10/2012 | Tetrault ............... C08J 3/24 252/78.3 |
| 2016/0177179 A1 | 6/2016 | Lecointe |

FOREIGN PATENT DOCUMENTS

| CN | 105950157 | | 9/2016 |
| FR | A-2370430 | * | 4/1983 |
| JP | H06157790 | * | 6/1994 |

OTHER PUBLICATIONS

Lentz, R.D. and Shainberg, I. and Sojka, R.E. and Carter, D.L. (1992) Preventing irrigation furrow erosion with small applications of polymers. Soil Science Society of America Journal. 56:1926-1932 (Year: 1992).*
Peixin, et al, "Synthesis and Water Absorbency of High-Water-Absorbing Poly(Sodium Acrylate-Acrylamide-2-Hydroxyethyl Methacrylate", Nov. 1999, vol. 15, No. 6, Polymer Materials Science and Engineering.
International Search Report PCT/EP2019/063385 dated Jul. 23, 2019.
Preliminary Search Report for FR 1854400 dated Jan. 8, 2019.

* cited by examiner

Primary Examiner — Charles R Nold
(74) Attorney, Agent, or Firm — B. Aaron Schulman, Esq.; Stites & Harbison, PLLC

(57) ABSTRACT

A method of stabilizing sandy soils is provided wherein 0.5 to 5 $L \cdot m^{-2}$ of an aqueous solution S having less than 2000 ppm of at least one water-soluble polymer is applied to the surface of a sandy soil in order to combat the phenomenon of wind erosion. The polymer may include ethylenically unsaturated monomers having at least one hydroxyalkylated monomer of formula (I) $H_2C=CR^1R^2$ in which $R^1$ is a hydrogen atom or a methyl group and $R^2$ being a hydrocarbon group containing at least one pendant group OH and optionally at least one N or O heteroatom in the hydrocarbon chain. This method is particularly applicable for the stabilization of mobile dunes and the suppression of sand migration that can impact infrastructure, inhabited areas and agricultural areas in arid, semi-arid and dry sub-humid areas.

12 Claims, No Drawings

METHOD FOR STABILIZING SANDY SOILS

FIELD OF THE INVENTION

The invention relates to a new method of stabilizing sandy soils in order to combat the phenomenon of wind erosion. This method is particularly applicable for the stabilization of mobile dunes and the suppression of sand migration that can impact infrastructure, inhabited areas and agricultural areas in arid, semi-arid and dry sub-humid areas.

Background of the Invention

Numerous means have been tested to try to combat the phenomenon of wind erosion of sandy soils.

For the fixation of dunes, several primary fixation techniques exist:

Mechanical stabilization of the dunes by means of palisades, windbreaks, and nets to slow down the wind and stop the transport of sand.

Mechanical stabilization of the dunes by means of a protective screen, natural or artificial, which uniformly covers the dune sand.

The aerodynamic method which aims to use the speed and the carrying capacity of the wind, either (i) by causing it to evacuate unwanted sand deposits by processes which increase the speed in contact with them (for example, the orientation of streets parallel to that of the prevailing wind, in certain Sahelian agglomerations; the laying of stones distant from each other along the crest of the dunes to be removed) and ensuring that it does not encounter any obstacle and thus transports the sand deposits away; or (ii) by profiling the obstacles encountered by the sand-laden wind so that its speed is not reduced, but on the contrary is increased; these obstacles have an aerodynamic effect on the flow of the wind current. Compression occurs which allows the wind speed to be accelerated without causing a vortex effect, which leads to sandy accumulations. This principle of accelerating or maintaining the wind speed stabilizes or increases the load capacity of the latter, and therefore its driving force. The wind then literally sweeps the sand we want to clear. This is the opposite of the principle of slowing the wind through palisades.

Dunes may also be stabilized by biological fixation by installing perennial tree and herbaceous vegetation.

As for the stabilization technique using a protective screen, many products may be used. By way of examples among all these products are comprised hydraulic binders (cements), bitumen emulsions, latexes (example: styrene butadiene emulsions), transformer oils, polymers based on urea and formaldehyde or 'urea and dicyandiamide, polyacrylamides, polyethylene glycol, epoxy resins, hydroxypropyl methyl celluloses (HPMC), HPMC grafted with methyl acrylate and vinyl acetate, acetate-based polymers vinyl, guar gums grafted with polyacrylamides.

The stabilization of sandy soils with protective screens generally involves a large volume of material and high application costs, making their application economically unviable. Sometimes, certain products must be mixed directly just before their application, which may be complicated in the field. Some stabilization processes work well in the laboratory, but require a mechanical mixing of the product solutions with the sand, which is limiting for logistical reasons (use of large construction machinery for example for mobile dunes). In addition, the high viscosity of some product solutions makes their spraying application difficult. Finally, to form a protective screen, the product solutions must be able to quickly penetrate the surface of the sand, in particular when this surface is on a slope (the solutions must not run off the surface).

DESCRIPTION OF THE INVENTION

The invention relates to a method of stabilizing sandy soils comprising applying to the surface of the sandy soil, at one time, from 0.5 to 5 $Lm^{-2}$ of an aqueous solution S comprising less than 2000 ppm of at least one water-soluble polymer A, said polymer A comprising ethylenically unsaturated monomers of which 0.01 to 20% by mol consists of at least one hydroxyalkylated monomer of formula (I) $H_2C=CR^1R^2$ in which $R^1$ being a hydrogen atom or a methyl group and $R^2$ being a hydrocarbon group containing at least one pendant group OH and optionally at least one N or O heteroatom in the hydrocarbon chain; $R^2$ being distinct from the C(=O)—OH group, the other monomers being nonionic and/or anionic and/or cationic monomers different from the monomer of formula (I).

Particularly advantageously, the solution S of the invention has a sufficiently low viscosity to be sprayed, to rapidly penetrate the surface of soils, and sufficiently reactive to solidify the surface of these soils and thus obtain a protective layer. In addition, its low concentration allows easy and inexpensive application compared to other more expensive sandy soil fixation technologies.

In the context of the present invention, the term "ethylenically unsaturated monomer" is understood to mean monomers comprising at least one $CH_2=C$ function.

By definition, sandy soil contains 70% or more sand. It is easy to identify because it is impossible to agglomerate a handful of the substance into a ball that does not crumble.

In the context of the present invention, a water-soluble polymer is a polymer which gives an aqueous solution without insoluble particles when dissolved with stirring for 4 hours at 25° C. and with a concentration of 50 $g \cdot L^{-1}$ in water.

Preferably, the water-soluble polymer A comprises between 0.01 and 5 mol % of at least one hydroxyalkylated monomer of formula (I) $H_2C=CR^1R^2$. The hydroxyalkylated monomer is preferably selected from the group consisting of hydroxyalkyl acrylate; hydroxyalkyl methacrylate; hydroxylalkyl acrylamide (example: hydroxyethyl methacrylate (HEMA) or N-methylol acrylamide (NMA)); hydroxylalkyl methacrylamide; methacrylamido propyldimethyl-2,3-dihydroxypropyl ammonium sulfate; 2,3-dihydroxypropyl methacrylate; amino alcohol acrylate; amino alcohol methacrylate; alkyl denoting a linear alkyl group comprising 1 to 6 carbon atoms.

The water-soluble polymer A also comprises nonionic and/or anionic and/or cationic monomers different from said hydroxylakylated monomer of formula (I).

The nonionic monomer(s) which may be used in the context of the invention may be chosen, in particular, from the group consisting of vinyl monomers soluble in water. Preferred monomers belonging to this class are, for example, acrylamide, methacrylamide, N-isopropylacrylamide, N, N-dimethylacrylamide and. Also, N-vinylformamide, N-vinyl acetamide, N-vinylpyridine and N-vinylpyrrolidone, acryloyl morpholine (ACMO) and diacetone acrylamide may be used. A preferred nonionic monomer is acrylamide.

The cationic monomer(s) which may be used in the context of the invention may be chosen, in particular from the groups consisting of monomers of the acrylamide, acrylic, vinyl, allylic or maleic type having a quaternary ammonium function. Mention may be made, in particular and in a nonlimiting manner, of quaternized dimethylaminoethyl acrylate (ADAME), quaternized dimethylaminoethyl methacrylate (MADAME), dimethyldiallylammonium chloride (DADMAC), acrylamido propyltrimethyl ammonium chloride (APTAC), and methacrylamido propyltrimethyl ammonium chloride (MAPTAC).

The anionic monomer(s) may be chosen from the group consisting of acrylic acid, methacrylic acid, itaconic acid, maleic acid, 2-acrylamido-2-methylpropanesulfonic acid (ATPS), vinylsulfonic acid, said anionic monomer being unsalted, partially or totally salified, and the salts of 3-sulfopropyl methacrylate. Preferably, the monomer is chosen from the group consisting of acrylic acid, methacrylic acid, itaconic acid, maleic acid, and 2-acrylamido-2-methylpropanesulfonic acid (ATPS), said monomers being under acid form, partially salified or totally salified.

Advantageously, the water-soluble polymer A contains less than 20 mol % of cationic monomer, even more preferably less than 5 mol %.

More advantageously, the polymer A contains only non-ionic and/or anionic monomers different from said hydroxylalkylated monomer.

The water-soluble polymer A preferably has an advantageously high molecular weight. The term "high molecular weight" denotes molecular weights of at least 0.1 million $g \cdot mol^{-1}$, preferably between 0.5 and 40 million $g \cdot mol^{-1}$, more preferably between 1 and 30 million $g \cdot mol^{-1}$. Molecular weight is referred to as weight average molecular weight. It is measured by measuring the intrinsic viscosity (Mark-Houwink formula).

The water-soluble polymer A is a polymer or a copolymer.

In general, the water-soluble polymer A may be obtained using all the polymerization techniques well known to those skilled in the art. It may in particular be polymerization by free radicals, polymerization in solution; gel polymerization; precipitation polymerization; emulsion polymerization (aqueous or reverse); suspension polymerization; reactive extrusion polymerization; or micellar polymerization.

The water-soluble polymer A is generally obtained by free radical polymerization, preferably by reverse emulsion polymerization or by gel polymerization. Free radical polymerization comprises free radical polymerization using UV, azo, redox or thermal initiators as well as controlled radical polymerization (CRP) or matrix polymerization techniques. These methods are well known to those skilled in the art.

According to the invention, the water-soluble polymer may have a linear, branched, star-shaped, comb-shaped or block-shaped structure. These structures may be obtained by selecting the initiator, the transfer agent, the polymerization technique such as the controlled radical polymerization known as RAFT (Reversible-Addition Fragmentation Chain Transfer), NMP (Nitroxide Mediated Polymerization) or ATRP (Atom Transfert Radical Polymerization), from incorporation of structural monomers, concentration, etc.

According to the invention, the water-soluble polymer A is advantageously linear or structured. By structured polymer is meant a non-linear polymer which has side chains so as to obtain, when this polymer is dissolved in water, a strong state of entanglement leading to very high low gradient viscosities. Preferably, the viscosity of the solutions S according to the—invention are between 2 and 200 cps, they are measured by any method known to those skilled in the art and preferably by means of a Brookfield viscometer, with an LV1 module, at 60 rpm and at 25° C. The water-soluble polymer according to the invention is generally not crosslinked.

According to the invention, the water-soluble polymer A may be in liquid, gel or solid form when its preparation includes a drying step such as spray drying, drum drying, radiation drying such as microwave drying, or even fluidized bed drying.

Preferably, the water-soluble polymer A is in the form of a water-in-oil reverse emulsion, the polymer concentration in the emulsion is preferably between 5 and 60% by weight, more preferably between 15 and 40% by weight relative to the weight of the emulsion.

According to another preference, the water-soluble polymer A is in the form of an aqueous dispersion. The aqueous dispersion comprises particles of water-soluble polymer A and at least one compound selected from an inorganic salt, an organic salt, an organic dispersing polymer and mixtures thereof.

The solution S of water-soluble polymer A applied to the surface of the sandy soil comprises less than 2000 ppm, preferably from 100 to 2000 ppm of water-soluble polymer A. More preferably, the solution S comprises between 300 and 2000 ppm of polymer A.

Those skilled in the art will know how to choose the most suitable technique for preparing solution S of water-soluble polymer A.

Advantageously, the solution S also comprises at least one substance of agronomic interest or at least one substance making it possible to improve the development or growth of plant material, preferably a substance chosen from fertilizers, hormones, microorganisms, mycorrhizae, growth stimulators, growth regulators, phytosanitary products, for example fungicides, insecticides, phytoprotectors. Preferably, when present, these substances of interest are included in solution S in an amount of 5 to 150 $g \cdot L^{-1}$ of solution S.

Preferably, solution S also comprises at least one inorganic or organic cationic salt. For example, it may be sodium, potassium, calcium, ammonium salts. The preferred salts being the potassium and calcium salts. Preferably, when present, the salts are included in solution S in an amount of 5 to 50 $g \cdot L^{-1}$.

There are many techniques that may be used to apply the solution S to the sandy soil surface. Among these means we find mobile land systems such as movable spray cannons, front ramps, beater sprinkler pivots with end cannon, without end cannon, fixed land systems such as drip irrigation, surface buried drip, micro sprinklers, the application may also be carried out by spraying. The application may also be carried out by air, by means of an airplane, a helicopter, a hang-glider, or a drone for example.

The solution S is preferably applied to the surface of the sandy soil by spraying. Even more preferably, it is applied by means of spray lances or spray trucks by ramps.

According to another preference, the solution S may be applied to the surface of the sandy soil by aerial spraying carried out by plane, helicopter, hang-glider or drone.

The aim is to form a layer of sandy soil soaked in solution S with a thickness advantageously between 0.1 mm and 15 cm, more advantageously between 5 mm and 3 cm.

Without wishing to be tied to any theory, the high heat at the surface of the sandy soil, in particular for the dunes in the desert, would transform the layer soaked in solution S into a rigid crust not very sensitive to wind erosion or solar radiation (UV).

For example, the thermal gradient of sand at 1 p.m. in the sun in the Tucson desert, is from 0 to 2 cm: 71.5° C., at 4 cm: 50° C., at 10 cm: 35.5° C., at 30 cm: 28.7° C.

The protective screen for sandy soils obtained by the method of the invention is particularly effective in desert areas. Desert areas may be hyper-arid (rainfall: 10 to 15 mm of water/year), arid (50 to 15 mm/year), semi-arid (200 to 400 mm/year) or dry sub-humid (up to 'at 600 mm/year). In desert areas, the suppression of sand migration may impact infrastructure, inhabited areas and agricultural areas The invention and the advantages resulting therefrom are evident from the following embodiments.

EXAMPLES

For all the examples which follow, the water-soluble polymers $A_n$ (n=0 to 4) are obtained by reverse emulsion polymerization. They are used as a water-in-oil reverse emulsion. The solutions S to be sprayed are prepared by adding this emulsion in a required quantity of water kept under stirring.

Polymers:

$A_0$: copolymer of sodium acrylate and acrylamide (30/70 mol %)—comparative example $A_1$: terpolymer of sodium acrylate, acrylamide and hydroxyethyl methacrylate (HEMA) (30/68/2 mol %)

$A_2$: terpolymer of sodium acrylate, acrylamide and HEMA (30/68/0.2 mol %)

$A_3$: sodium acrylate, acrylamide and HEMA terpolymer (30/68/0.4 mol %)

$A_4$: terpolymer of sodium acrylate, acrylamide and HEMA (30/68/0.6 mol %)

Example 1: Protective Layer and Mechanical Resistance

Four separate aqueous solutions are prepared from 500 ppm of the water-soluble polymers $A_0$, $A_1$, $A_2$, and, $A_4$. During the preparation of the solution containing $A_4$, 5 g·L$^{-1}$ of a soluble NPK fertilizer (20/20/20) is added.

Each of these solutions is then applied to the surface of a separate cup containing a 7 mm layer of 50-70 mesh standard sand.

The cups are then placed in an oven at 70° C. for 4 hours to simulate the heat on the surface of a hot desert. The crusts thus formed are broken with a standardized laboratory penetrometer of the Andilog brand.

The compressive strengths measured are 0.25 kg·cm$^{-2}$ when the water-soluble polymer used to form the protective layer is $A_1$, 0.65 kg·cm$^{-2}$ for $A_2$, and 1.21 kg·cm$^{-2}$ for the solution containing the mixture $A_4$ and NPK.

Comparatively, the compressive strength is 0.16 kg·cm$^{-2}$ when the protective layer is obtained from a solution prepared from $A_0$.

The protective layers formed according to the method of the invention are the most resistant.

Example 2

Five separate aqueous solutions $B_0$ to $B_4$ are prepared from 500 ppm of water-soluble polymer $A_4$, with the addition of cationic salts (from $B_1$ to $B_4$)

$B_0$: 500 ppm of $A_4$
$B_1$: 500 ppm of $A_4$, 20 g·L$^{-1}$ NaCl
$B_2$: 500 ppm of $A_4$, 20 g·L$^{-1}$ CaCl$_2$
$B_3$: 500 ppm of $A_4$, 20 g·L$^{-1}$ KCl
$B_4$: 500 ppm of $A_4$, 20 g·L$^{-1}$ (NH$_4$)$_2$SO$_4$ Each of these solutions is then applied to the surface of a separate cup containing a 7 mm layer of 50-70 mesh standard sand.

The cups are then placed in an oven at 70° C. for 4 hours to simulate the heat on the surface of a hot desert. The crusts thus formed are broken with a standardized laboratory penetrometer of the Andilog brand.

The measured pressure resistances are:
0.69 kg·cm$^{-2}$ for solution $B_0$
1.61 kg·cm$^{-2}$ for solution $B_1$
1.76 kg·cm$^{-2}$ for solution $B_2$
1.76 kg·cm$^{-2}$ for solution $B_3$
1.72 kg·cm$^{-2}$ for solution $B_4$

Example 3: Resistance to Wind Erosion

Two aqueous solutions containing respectively 500 ppm of the water-soluble polymers $A_0$ and $A_4$ are prepared and are then applied to the surface of separate cups containing a layer of 7 mm of 50-70 mesh standardized sand. The cups are then placed in an oven at 70° C. for 4 hours so as to simulate the heat on the surface of a hot desert (as for example 1).

A blower device is installed to simulate the action of a wind loaded or not with sand particles. Knowing that a desert grain of sand is mobile from a wind of 55 m·s$^{-1}$, a wind of 12 m·s$^{-1}$ is applied to simulate gusts that may exist in deserts. For information, a cup of untreated sand subjected to this wind loses 95% of its mass in just 10 minutes, whether the wind is loaded with sand or not.

A hot wind (70° C.) of 12 m·s$^{-1}$ not loaded with sand, is applied parallel to the surface of the protective layer obtained from the polymer solution $A_4$. After 1 hour no erosion of the protective layer was observed and the cup retained its mass of sand.

Comparatively, the cup treated from the water-soluble polymer $A_0$ loses 2% of its mass in 1 hour.

A hot wind (70° C.) of 12 m·s$^{-1}$, with a sand load of 10 grams·min$^{-1}$·cm$^{-2}$ for 1 hour (the abrasive effect of the sand increases the speed of erosion of a surface) is applied parallel to the surface of the protective layer obtained from the polymer solution $A_4$. After 1 hour no erosion of the protective layer was observed and the cup retained its mass of sand.

Comparatively, the cup treated from the water-soluble polymer $A_0$ loses 15% of its mass in 1 hour.

The protective layer formed with an $A_4$ polymer solution in accordance with the process of the invention strongly resists wind erosion from sand-laden winds, such as desert winds.

Example 4: Viscosity Measurements

Four separate aqueous solutions are prepared from 500 ppm of the water-soluble polymers $A_0$, $A_2$, $A_3$ and $A_4$. The viscosities of these solutions are respectively 54, 16, 10 and 6 centipoise. The viscosities are measured using a Brookfield viscometer, with an LV1 modulus, at 60 rpm and at 25° C.

There is a ratio of almost 10 between the viscosity of the solution prepared from $A_0$ and that prepared from $A_4$.

Example 5: Stability of the Polymer Solution

The aqueous solution containing 500 ppm of polymer $A_4$ is placed in an oven at 50° C. for 7 hours to simulate possible storage in a spray tank.

This solution is then applied to the standardized sand (50-70 mesh) and then returned to the oven (following the protocol of Example 1). The pressure resistance (with penetrometer) measured is 0.62 $kg \cdot cm^{-2}$.

The strength of the protective layer of sand is not affected when the HEMA-based polymer spray solution is stored at temperatures such as those observed in a desert environment.

Example 6: Infiltration Rate of the Polymer Solution at the Surface of the Sand

Two aqueous solutions containing respectively 500 ppm of water-soluble polymer $A_0$ and $A_4$ are prepared and then applied separately to the surface of standardized sands contained in graduated glass beakers. The duration of infiltration at the surface of the sand is measured as a function of time. The polymer solution $A_4$ reaches the threshold of 5 cm in 40 seconds while the polymer solution $A_0$ reaches the threshold of 5 cm in 170 seconds.

Example 7: Stabilization of a Mobile Dune

An aqueous solution containing 500 ppm of water-soluble polymer $A_4$ is prepared to fill a 10 m³ tank placed in a desert area. Native seeds are then added to the tank. The resulting solution is sprayed evenly onto the surface of a moving sand dune using a centrifugal pump and a spray lance to apply 1 L·m$^{-2}$ of solution.

A protective layer forms after a few hours to a depth of 3 mm on the surface of the dune. After a few months, the protective layer is still present, the dune has not migrated and the rainfall has allowed the vegetation to colonize the dune space.

Example 8: Stabilization of Railway Shoulders

An aqueous solution containing 500 ppm of water-soluble polymer $A_4$ is prepared to fill a 54 m³ tank car in a desert area. Native seeds are added to the cistern. The resulting solution is sprayed evenly on the surface of the shoulders of the railway track using a centrifugal pump and a spray lance to apply 1 L·m$^{-2}$ of solution.

A protective layer forms after a few hours to a depth of 3 mm on the surface of the shoulders. After a few months, the protective layer is still present, the shoulder has not migrated and it is colonized by vegetation. The railroad is not silted up.

Example 9: Stabilization of an Artificial Defensive End

An aqueous solution containing 500 ppm of water-soluble polymer A$A_4$ is prepared to fill a 20 m³ tank in a desert area. The resulting solution is sprayed evenly onto the surface of an artificial dune, used as a defensive barrier, by means of a centrifugal pump and a spray lance to apply 1 L·m$^{-2}$ of solution.

A protective layer forms on the surface of the artificial dune after a few hours to a depth of 3 mm and prevents its migration. The artificial dune is thus stabilized.

The invention claimed is:

1. A method for stabilizing sandy soils having a surface, said method comprising applying in one application to said surface of said sandy soils from 0.5 to 5 L·m$^{-2}$ of an aqueous solution S comprising from 100 to 2000 ppm of at least one water-soluble polymer A, said at least one water-soluble polymer A comprising ethylenically unsaturated monomers of which 0.01 to 20 mol % consists of at least one hydroxyalkylated monomer of formula (I) $_2C{=}CR^1R^2$ in which $R^1$ is a hydrogen atom or a methyl group and $R^2$ being a hydrocarbon group containing at least one pendant group OH and optionally at least one N or O heteroatom in the hydrocarbon chain; $R^2$ being distinct from the C(=O)—OH group, said at least one water-soluble polymer A further comprising at least one anionic monomer selected from the group consisting of acrylic acid, methacrylic acid, itaconic acid, maleic acid, and 2-acrylamido-2-methylpropanesulphonic acid (ATPS), said monomers being in acid, partially salified, or totally salified form, the other monomers being nonionic and/or cationic monomers different from the monomer of formula (I).

2. The method for stabilizing sandy soils according to claim 1, wherein the at least one water-soluble polymer A comprises between 0.01 and 5 mol % of at least one hydroxyalkylated monomer of formula $H_2C{=}CR^1R^2$.

3. The method for stabilizing sandy soils according to claim 1, wherein the hydroxyalkylated monomer is selected from the group consisting of hydroxyalkyl acrylate; hydroxyalkyl methacrylate; hydroxylalkyl acrylamide; hydroxylalkyl methacrylamide; methacrylamido propyldimethyl-2,3-dihydroxypropyl ammonium sulfate; 2,3-dihydroxypropyl methacrylate; amino alcohol acrylate; amino alcohol methacrylate; alkyl denoting a linear alkyl group comprising 1 to 6 carbon atoms.

4. The method of stabilizing sandy soils according to claim 1, wherein the at least one water-soluble polymer A has a molecular weight greater than 0.1 million g/mol.

5. The method of stabilizing sandy soils according to claim 1, wherein the at least one water-soluble polymer A is in the form of a water-in-oil inverse emulsion.

6. The method for stabilizing sandy soils according to claim 1, wherein the at least one water-soluble polymer A is in the form of an aqueous dispersion.

7. The method of stabilizing sandy soils according to claim 1 wherein the solution S comprises between 300 and 2000 ppm, of polymer A.

8. The method for stabilizing sandy soils according to claim 1, wherein the solution S further comprises at least one substance selected from the group consisting of fertilizers, hormones, microorganisms, mycorrhizae, growth stimulators, growth regulators, phytosanitary products, fungicides, insecticides, and phytoprotectors.

9. The method for stabilizing sandy soils according to claim 1, wherein the solution S also comprises an inorganic or organic cationic salt.

10. The method of stabilizing sandy soils according to claim 1, wherein the solution S is applied to the surface of the sandy soil by spraying.

11. The method of stabilizing sandy soils according to claim 1, wherein the solution S is applied to the surface of the sandy soil by spraying using spray nozzles or spray trucks by spraying booms.

12. The method for stabilizing sandy soils according to claim 1, wherein the solution S is applied to the surface of the sandy soil by aerial spraying carried out by plane, helicopter, hang-glider or drone.

* * * * *